United States Patent [19]

Ayrest

[11] Patent Number: 5,025,137

[45] Date of Patent: Jun. 18, 1991

[54] THERMOPLASTIC HEATING APPARATUS

[76] Inventor: Robert B. Ayrest, 6160 Cobble Stone Rd., Placerville, Calif. 95667

[21] Appl. No.: 409,606

[22] Filed: Sep. 18, 1989

[51] Int. Cl.[5] .............................................. H05B 3/42
[52] U.S. Cl. ...................................... 219/521; 392/423
[58] Field of Search ............... 219/521, 243, 354, 347, 219/342, 385, 386, 542; 392/424, 423

[56] References Cited

U.S. PATENT DOCUMENTS

| | | | |
|---|---|---|---|
| 2,022,466 | 11/1935 | Hess | 219/342 |
| 3,587,956 | 6/1971 | Oelke | 219/342 |
| 3,782,615 | 1/1974 | Webster | 219/243 |
| 3,847,712 | 11/1974 | Hubbard | 219/243 |
| 3,916,148 | 10/1975 | LaFleur | 219/243 |
| 4,244,771 | 1/1981 | Pierce | 219/243 |
| 4,897,030 | 1/1990 | Vajtay | 219/243 |

*Primary Examiner*—Teresa J. Walberg
*Attorney, Agent, or Firm*—Bernhard Kreten

[57] ABSTRACT

An apparatus for heating thermoplastic sheet material which includes a knockdown frame which slideably supports a plurality of heating rods thereon. The heating rods have a configuration adapted to localize heat on the thermoplastic sheet material and is provided with a support surface for the thermoplastic sheet material which precludes marring of the thermoplastic material. The apparatus further includes a control box for regulating the amount of heat transmitted to the sheet material and a fence structure configured as a substantially inverted T. Indicia is supported on the frame in order to facilitate using the apparatus.

22 Claims, 4 Drawing Sheets

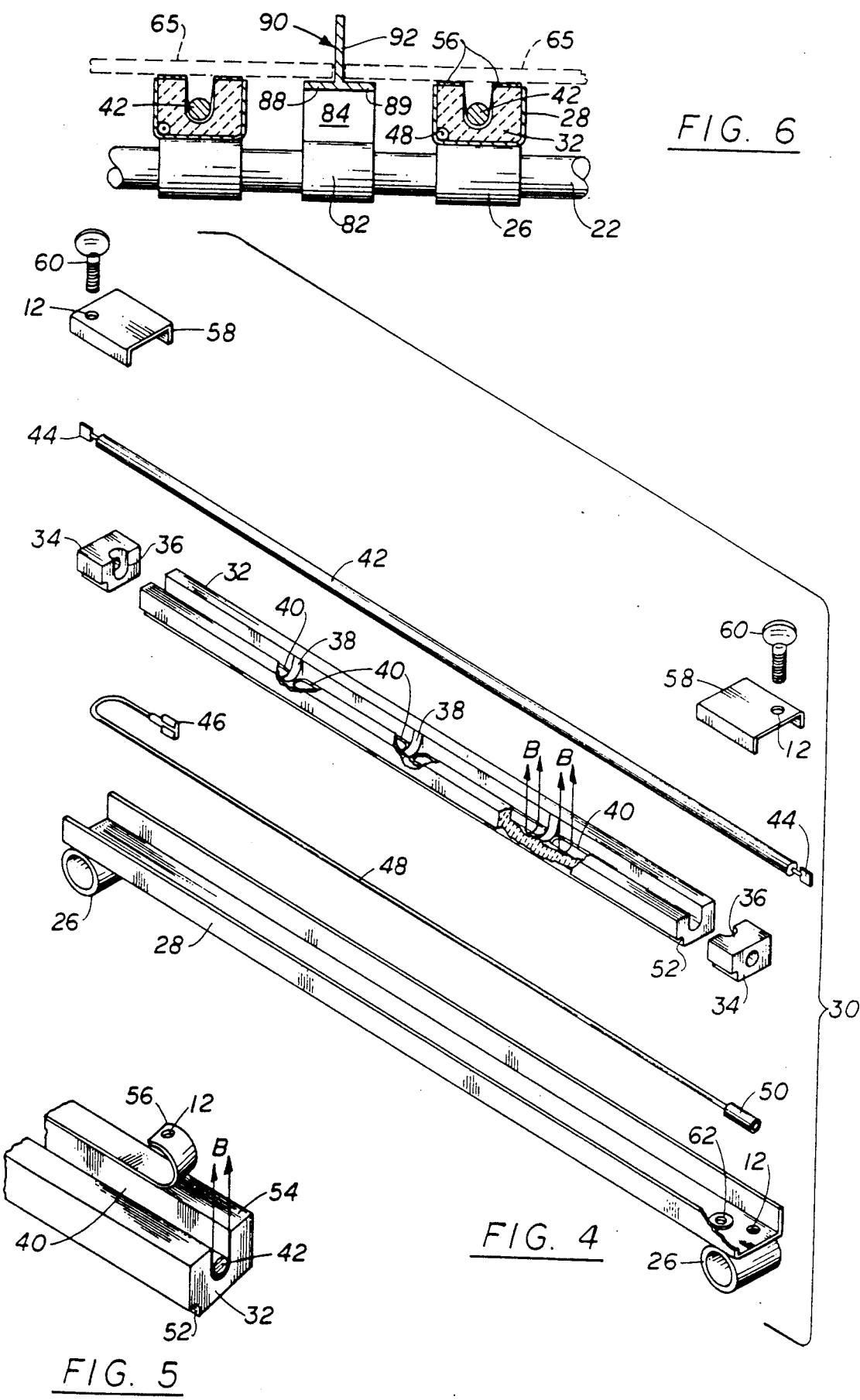

THERMOPLASTIC HEATING APPARATUS

BACKGROUND OF THE INVENTION

The following invention relates generally to an apparatus used to heat thermoplastic material to effect bending within the thermoplastic material.

Frequently it is desirable to take substantially planar material and bend the material to conform to a finished product. The material to be reformed is formed from a plastic material that is sensitive to heat. This process usually entails placing the thermoplastic material adjacent a source of heat for a period of time, thereby allowing the thermoplastic material to become locally deformable, for subsequent reorientation. Thereafter, the thermoplastic material is removed from the source of heat. As the material cools, it stiffens and retains the shape to which it has been formed.

Although various products currently exist on the market, generally they all include an elongate rod of conductive material which acts as a source of heat because of the resistive nature of the material forming the rod. This localized source of heat when placed in contact adjacent the thermoplastic sheet material allows the plastic to become soft and pliable for subsequent reformation.

One known example is illustrated in U.S. Pat. No. 4,244,771, issued to Pierce and dated Jan. 13, 1981. Pierce teaches the use of a strip heater assembly in which a heating element is supported on a bed of insulating material having an open top wall, the width of which is adjustable to control the magnitude of the heat emanating from the heater. A sheet of material to be deformed is placed above the heater element, resting on top flanges of a housing. In addition, the sheet of thermoplastic material is supported on a top surface of a platform and has an edge which abuts against a stop of a further platform disposed at one end of the assembly. Thus, the appropriate area for heat application is properly indexed and the sheet is sufficiently supported to assure deformation of the sheet only at the desired site. In addition, a plurality of heater elements could be used spaced one from the other.

The included brochures and other literature reflect the state of the art further and all are tendered with the view towards discharging applicant's acknowledged duty to disclose relevant prior art. However, it is stipulated that none of these citations, either singularly or in any conceivable combination teach or render obvious that which is the nexus of the claimed invention.

SUMMARY OF THE INVENTION

The instant invention is distinguished over the known prior art in a plurality of ways.

For example, placement of a thermoplastic sheet on a support surface which overlies the heating element frequently will provide a blemish on the thermoplastic material generally perceived in the industry as a clouded or chalky area formed by contact of the thermoplastic sheet against the supporting surface of the heating element. The instant invention avoids this objectionable blemish by ensuring that the thermoplastic sheet only rests against a contact area configured to preclude chalkiness.

Another, more fundamental characteristic of the instant invention involves the manner in which the components are assembled. Although it is likely to assemble a heater apparatus in one location and leave it assembled for the duration of its use, it is desireable to fabricate such a heater assembly in such a way that it can be disassembled for subsequent transport. Thus, the device according to the instant invention is fashioned to be knocked down and reassembled for ease in transport upon both initial sale of the apparatus, and subsequent relocation and deployment of the heater unit as is desired by the owner. A further area which distinguishes the instant invention over the known prior art includes the means by which the knockdown frame is trued upon fabrication. Heretofore, awkward shimming has been the technique by which a frame was trued. This of course makes it easy to be dislodged, and involves in inordinate amount of time an retruing, should the device be jarred. The structure according to the instant invention provides a plurality of downwardly extending legs each of which are provided with means for leveling the legs so that side rails which support the apparatus can be reliably positioned on a support surface.

A further area of marked difference when contrasted with the known prior art involves the relationship of the heating element to its associated surrounding surfaces which both support the heating element and direct the heat towards the thermoplastic sheet material. Heretofore, the heating element has been connected to a source of power by means of crimp connections, which, while reliable, did not lend themselves to replacement and substitution. The instant invention provides plug type connectors for removable attachment of the heating element with respect to its associated circuitry. In addition, the heating element is adapted to reside within a trough of substantially U-shaped configuration along its length having semi-hemispherical end walls providing cupped ends. These end walls enhance the focusing of heat adjacent end portions of the heating element and assure that there will be a uniform heating gradient along entire length of the heating element, minimizing edge effects. In addition, the heating element is supported in the trough by a plurality of upwardly extending support bars integrally formed with the trough and fabricated from non-heat conductive material. Thus, the heating element, except for a few places in contact with the trough is supported in the air above the trough avoiding vexing prior art problems with respect to heat conductivity and heat focusing.

A further novel feature which distinguishes the instant invention over the known prior art involves the configuration of a support fence assembly against which an edge of the thermoplastic sheet is adapted to abut. A fence having a substantially inverted "T" shaped cross section allows abutment of the thermoplastic sheet material thereagainst. When heating elements are disposed on opposite sides of the fence, two separate bends can be formed in rapid succession because there are two heated areas or heated zones. Thus, the table's capacity is doubled. One can work from both sides of the fence to make multiple heated areas.

OBJECTS OF THE INVENTION

Accordingly, it is a primary object of the present invention to provide a novel and useful thermoplastic heating apparatus.

A further object of the present invention is to provide a device as characterized above which is extremely durable in construction, safe to use and lends itself to mass production techniques.

A further object of the present invention is to provide a device of the character described above in which objectionable discoloration of thermoplastic material, sometimes referred to as chalkiness, will have been obviated thereby.

A further object of the present invention is to provide a device as characterized above in which the heat emanating from the heating rod is more properly focused than in prior art devices.

A further object of the present invention is to provide a device of the character above wherein the heating rod is capable of rapid replacement by virtue of releasable plug-type fasteners.

A further object of the present invention is to provide a device of the character described above wherein the entire assembly is capable of disassembly and reassembly in a minimal amount of time with no special tools required for assembly.

A further object of the present invention is to provide a device of the character described above which when assembled can be reliably trued and then efficiently operated.

A further object of the present invention is to provide a device of the character described above wherein a fence is provided having a substantially inverted "T" shaped configuration whereby heating elements on opposed sides of the T can be utilized with the fence as an abutment so that a series of zones can be heated in rapid succession.

Viewed from a first vantage point, it is an object of the present invention to provide an apparatus for heating thermoplastic sheet material, which comprises, in combination: a knockdown frame assembly, support means coupled to said frame assembly, a heating rod housed within the support means, and coating means on said support means oriented to contact the sheet material while it is being heated, said coating means protecting the sheet material from forming a chalk-like flaw normally encountered when contacting prior art support means.

Viewed from a second vantage point, it is an object of the present invention to provide an apparatus of the character described immediately here in above which finds particular utility for heating thermoplastic sheet material which includes a knockdown frame, support means coupled to said frame assembly, a heating rod housed within said support means including a trough having a substantially U-shaped cross section along its length and end caps connected to extremities of said trough, said end caps configured as a recess of substantially semihemispherical configuration, said heating rod resting in said trough on a plurality of saddles extending up from said trough, whereby said trough and end caps focus heat from said heating rod inwardly. This helps reduce a problem called "cold ends."

Viewed from yet another vantage point, it is an object of the present invention to provide an apparatus for heating thermoplastic sheet material, comprising in a combination: a knockdown frame assembly, said frame formed from two spaced parallel side rails interconnected at extremities of said side rails by a pair of spaced parallel end rails, all said rails collectively defining a substantially rectangular frame which is interconnected with fasteners allowing the frame to be knocked down, a pair of slide tubes interconnecting said end rails, oriented parallel to and inboard of said end rails, support means coupled to said frame assembly, said support means slideably disposed on said slide tubes, and a heating rod housed within said support means. Thus the device is nearly impossible to assemble incorrectly.

These and other objects will be made manifest when considering the following detailed specification when taken in conjunction with the appended drawing figures.

DESCRIPTION OF THE DRAWING FIGURES

FIG. 4 is an exploded parts perspective of the heating rod and its support trough according to the present invention.

FIG. 5 shows a construction detail from FIG. 4 in perspective.

FIG. 6 shows a construction detail in cross section from FIG. 1.

BRIEF DESCRIPTION OF THE PREFERRED EMBODIMENT

Figure 1:
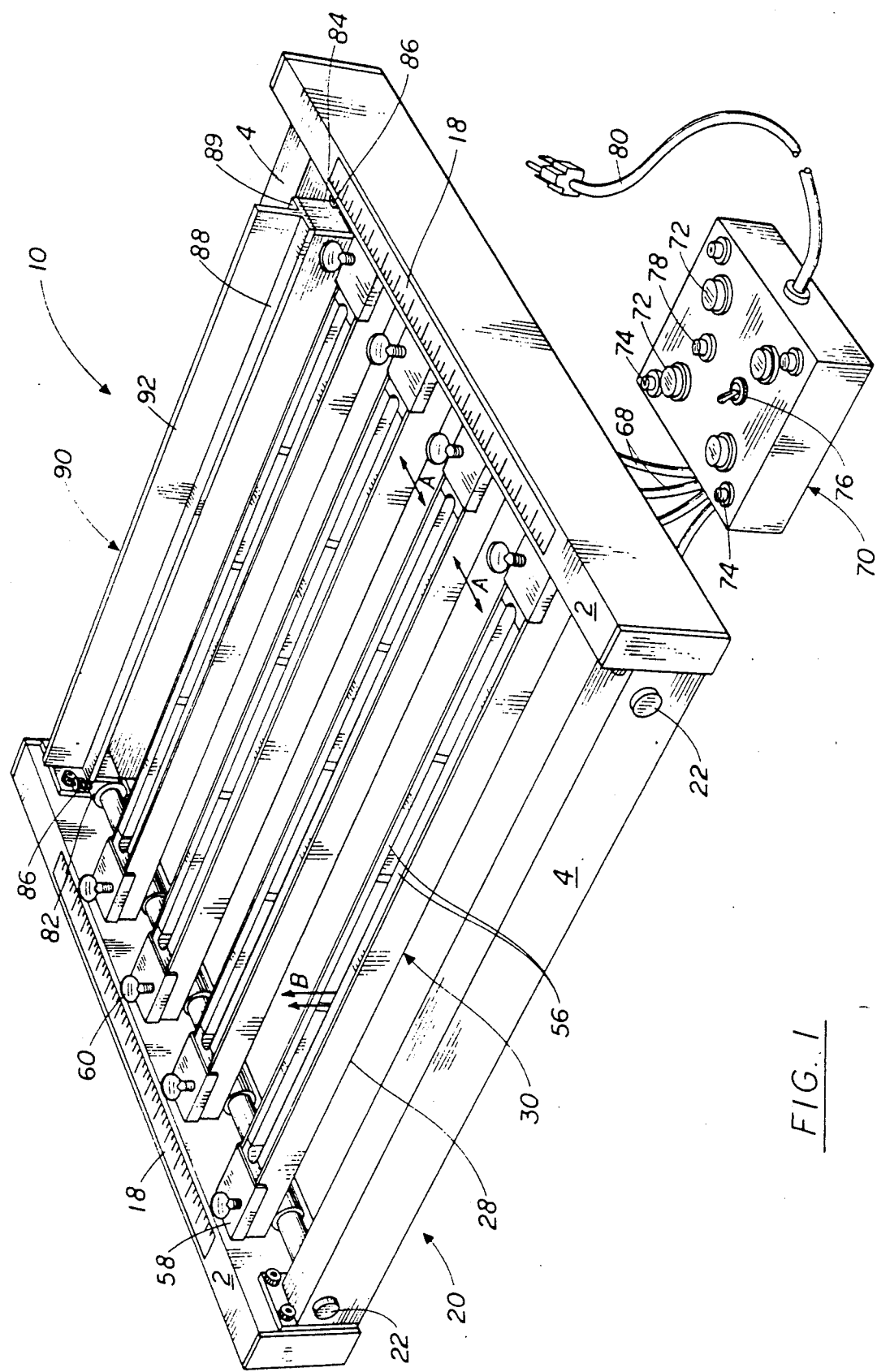
FIG. 1 is a perspective view of the apparatus according to the present invention.

Referring to the drawings now, wherein like reference numerals refer to like parts throughout the various drawing figures, reference numeral 10 is directed to the apparatus for heating thermoplastic sheet material according to the present invention.

In its essence, the apparatus 10 includes a frame 20, a heating rod 42 and its support mechanism 30, an oval recess 40 underlying and partially supporting the heating rod, a control box 70 operatively coupled to the heating rod, and a fence assembly 90 against which the thermoplastic sheet material abuts as will be described.

Figure 2:
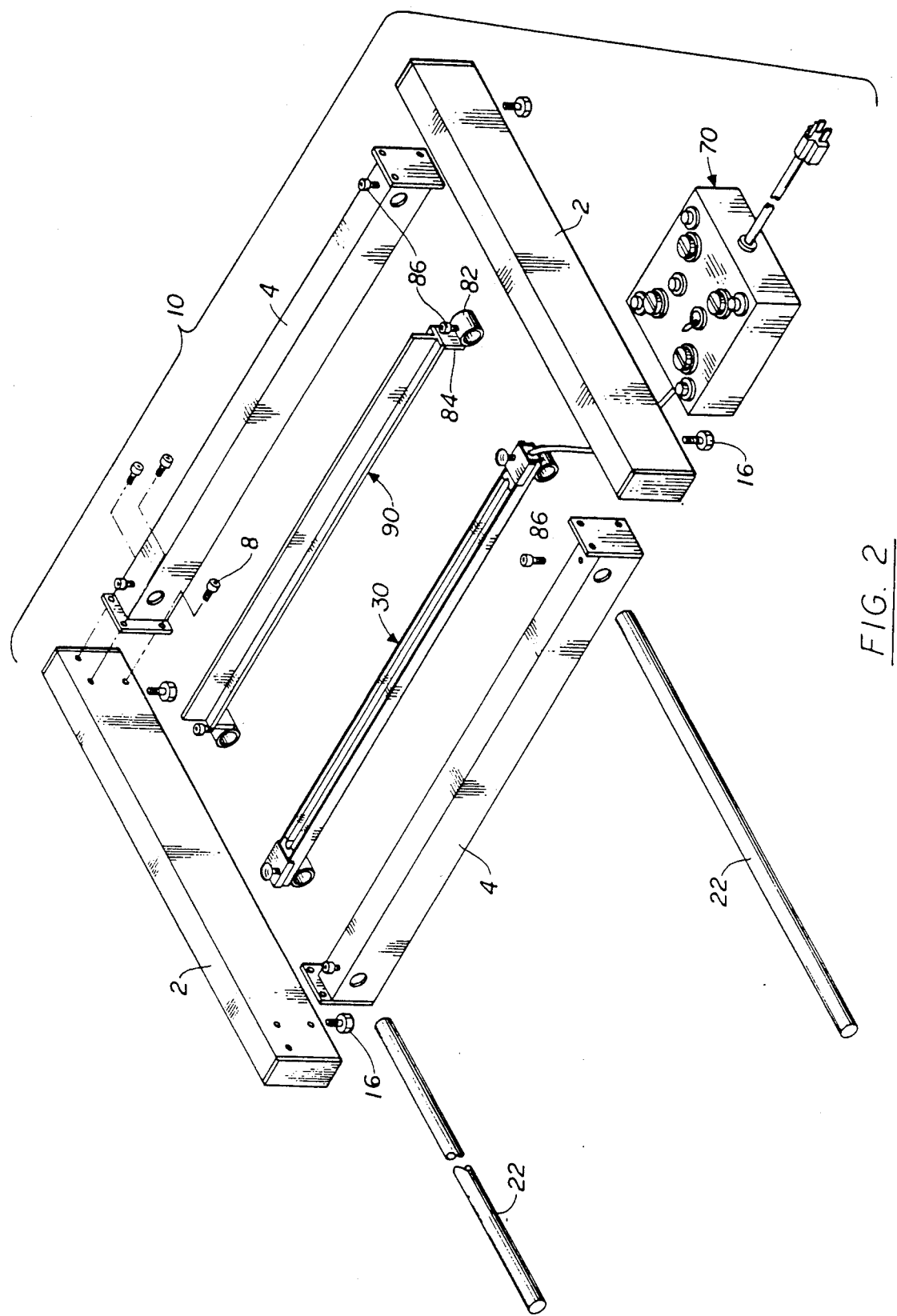
FIG. 2 is a similar, perspective view with the certain components of FIG. 1 disassociated to show certain knockdown features.
Figure 3:
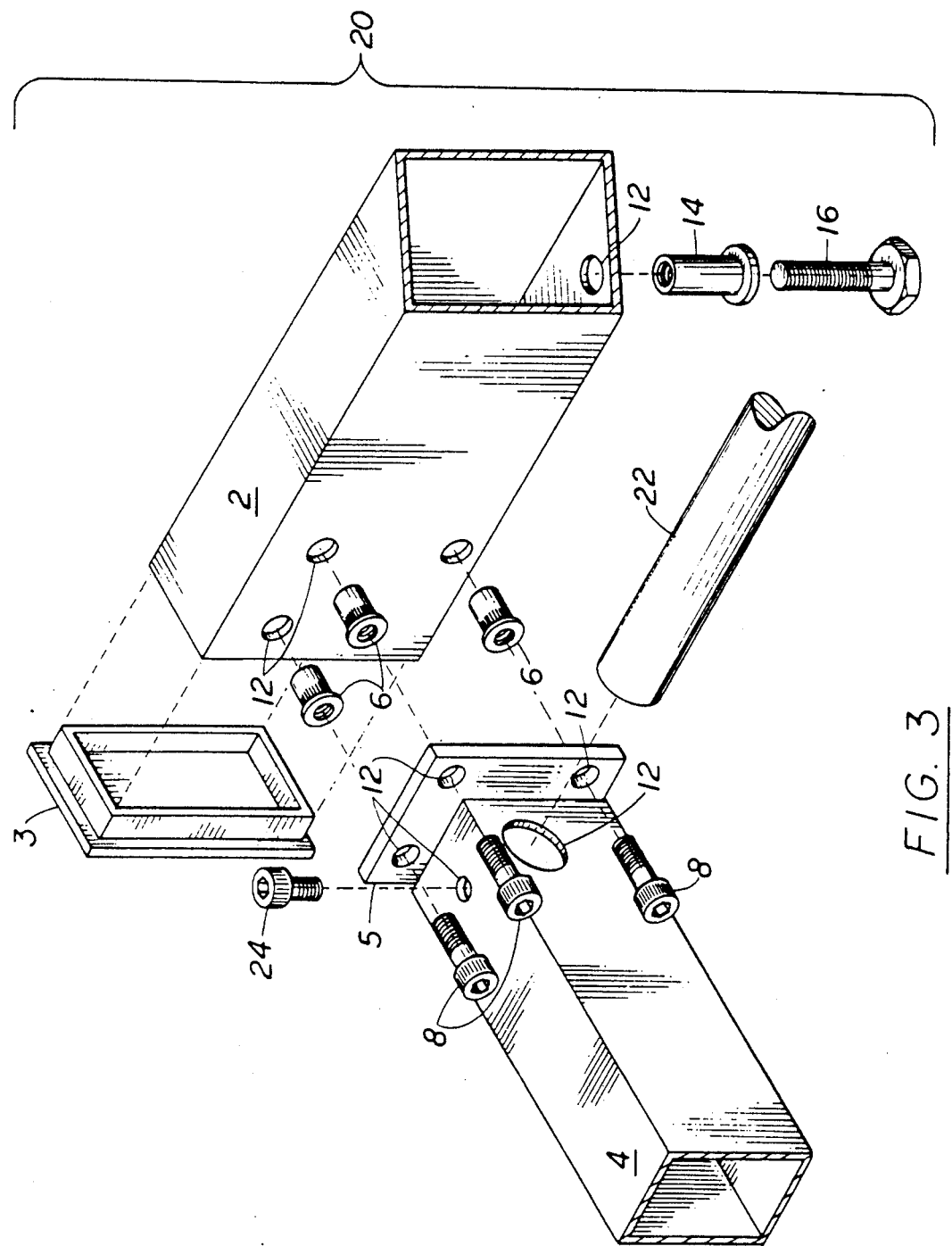
FIG. 3 is a perspective detail of one knockdown feature shown in FIGS. 1 and 2.

More particularly, and with particular reference to FIGS. 1 through 3, the frame 20 of the apparatus 10 includes a pair of spaced parallel side rails 2 interconnected at opposed extremities by means of spaced parallel end rails 4 so that a substantially rectangular frame is provided. The joining details are shown in FIG. 3.

Both the side and end rails are made from stock material of substantially rectangular cross section, and the side rails 2 include end caps 3 at opposed extremities, thereby occluding the interior of the side rail 2. The end rails 4 are provided at their extremities with flanges 5 having a plurality of holes 12 circumscribing the outer periphery thereof. Complementally formed holes 12 are found on walls of the side rails 2 as shown in FIG. 3 spaced to register with the holes 12 on the flange 5. A plurality of bolts 8 are adapted to pass through the flange 5 and fix within the holes 12 on the side rails 2. In order to fasten same, frictionally retained bushings 6 in the shape of a sleeve having locking spines on an outer periphery thereof are press fit within the holes 12 on the side rails 2. An interior bore of these bushings 6 is provided with interior threading complemental to the threads on the bolts 8. Thus, the end rails 4 and side rails 2 can be rapidly connected and disconnected, thereby providing a knockdown feature unknown in the prior art.

As shown in FIG. 3, the end cap 3 can be formed with a planar exterior wall portion and a box shaped interior portion which presses within the inner walls defining the side rails 2 to frictionally retain the end cap 3 in position. The flange 5 can similarly have a box like interiorly directed wall which is press fit within the interior side walls of the end rails 4. Alternatively the flange 5 can be fixed into the end rails 4 by means of adhesive, welding or other known methods of manufacture.

Judiciously spaced along the bottom surface of each side rail 2 are a plurality of adjusting legs 16 configured as bolts. As shown, the bottom surface of each side rail is provided with similar holes 12 as previously discussed dimensioned to frictionally receive and fix therewithin a complementally formed leveling adjustor 14 analogous to bushings 6. The leveling adjustor 14 is press fit within the holes 12 and has an interior thread complemental to the threads contained on the adjusting leg bolt 16. Thus, the frame 20 can be trued to accommodate different types of tables having somewhat uneven contours so as to provide an apparatus 10 which is level and stable.

Top surfaces of the side rails 2 are provided with indicia 18 in the form of graduated rules or other types of scale for purposes to be assigned.

The end rails 4 also support a pair of spaced parallel slide tubes 22 placed inboard of the side rails 2. These slide tubes 22 can be of hollow or solid stock and are adapted to pass through complementally formed openings 12 contained on an inner facing vertical wall of the end rails 4 addressing the interior of the frame. The slide tubes 22 are fixed within the end rails 4 by means of an Allen screw 24 which passes through a threaded bore on a top surface of the end rail 4 frictionally engaging the slide tube 22 and fixing same in position. The slide tubes 22 support slide sleeves 26 for purposes to be assigned as shown in FIG. 6.

The heating rod and support structure 30 is best seen and described with respect to FIGS. 1 and particularly 4. As there shown, the heating rod and support 30 includes a substantially U-shaped channel 28 having a bight portion and two upwardly extending legs. The channel 28 is supported on the slide sleeves 26 at opposed extremities thereof on bottom surfaces of the bight portion. A hole 12 passes through the bight portion of the U-shaped channel 28 just overlying the slide sleeve 26 so that a wing nut 60 can pass therethrough, fixing the U-shaped channel on the slide tube 22 and also allow facile adjustment of the heating rod and support 30 along the direction of the double ended arrows A, of FIG. 1.

A trough 32 is supported by the U-shaped channel 28. As shown, the trough 32 supports the heating rod 42 in a manner to be defined. As such, it is foreseeable that the trough will be exposed to extreme temperatures. Thus, a trough formulated from Silicone Silicate or Calcium Silicate appears to provide excellent heat resistance. One known substance is commercially available marketed under the name of Marinite I. Opposed extremities of the trough 32 are encapsulated by means of end caps 34. Each end cap 34 has a semihemispherical recess 36. The heating rod 42 is dimensioned to reside atop the recess defined by the trough 32 and the semihemispherical recess 36. As shown, a plurality of upwardly extending support saddles 38 are used to keep the heating rod 42 elevated from the bottom surface of the trough 32. Collectively, the effect of the U-shaped trough and its associated adjacent saddle 38 at opposed extremities collectively define plural oval recesses 40, a series of which are positioned along the length of the trough 32. An alternative to the saddle 38 would be a pin, formed from metal, embedded in the insulation, transverse to rod 42. Prior art heating rod devices do not provide for adequate spacing between the trough and the heating rod. Moreover, none provide for oval recesses which accelerate and beneficially enhance the upward migration of heat from the rod towards the thermoplastic material. With improved ventilation, the system can be efficiently designed and a minimal amount of electrical resistance can be sent through the heating rod to provide the desired effect, because the heat radiating from the trough is more focused. As shown in FIGS. 1, 4 and 5, elevating the heating rod 42 away from the trough 32 allows greater circulation of the heat. This provides less heat transfer loss into the insulation 32 thence to U-shaped channel 28. Air along the direction of the arrows B provides improved heating characteristics against the thermoplastic material.

The heating rod 42 is coupled to a source of power to effect resistive heating. Terminal extremities of the heating rod 42 are provided with male blade lug electrical connectors 44 adapted to be connected with female counterparts 46 as shown. The female sleeve lug electrical connectors 46 in turn communicate with conductor 48 on either end. Both ends terminate in a fitting 50 and thereafter communicates with a twin lead conductor 68 (FIG. 1) extending from each of several heating rods 42 and to a control box 70. FIG. 4 shows a bushing 62 through which conductor 68 passes to provide strain relief.

Note that the trough 32 includes a recess 52 routed at a lower outboard edge so that clearance is provided for the conductor 48. Also, in FIG. 5 the trough 32 is provided with a painted top surface 54 on both sides of the U-shaped trough. The paint 54 comes from a class of paints characterized in its ability to resist extremely high temperature. The paint is sprayed on a roughened surface of the Silicone Silicate. The purpose of the high temperature paint is two-fold: it bonds extremely well into the quite shallow pores of the trough's top surface, and it provides a good surface upon which Teflon tape 56 is to adhere. The Teflon tape 56 forms the top exterior surface against which thermoplastic sheet material resides. The tape is in direct contact with the thermoplastic sheet material. This solves the long standing and vexing problem of chalky discoloration caused by heat addressing soft and pliable thermoplastic sheet material. Apparently heretofore, the presence of the thermoplastic sheet so close to the heat source and its contact with other material would leave surface imperfections so pervasive on its area of contact, that the transparent finish of the thermoplastic heat was roughened providing the chalkiness. Note the hole 12 on tape 56 in FIG. 5. A bead of silicon sealant will fix the tape to the paint 54 via the hole 12. Silicon sealant can also be used to fix the trough 32 and cap 34 together.

Finally, note the presence of channel end covers 58 which overlie extremities of the heating rod and support 30. These channel end covers have a hole 12 which is in registry with the hole 12 formed in the U-shaped channel 28. The wing nut 60 (mentioned supra) passes through the end cover 58 and communicates with the threaded bore on the slide sleeve 26 which rides on the sleeve tube 22. Loosening and tightening of the wing nut 60 allows the heat rod and support 30 to translate in the direction of the double ended arrows A and be fixed on the slide tubes 22. The end channel covers 58 assist in forced distribution when securing the wing nut on the slide tube 22.

As mentioned briefly, a plurality of conductors 68 extend from each of the plural heating rods 42 as in FIG. 1. The conductors 68 couple to a control box 70 and each heating rod 42 can be controlled independently and infinitely by virtue of variable resistors or potentiometers 72 extending upwardly from the control box 70. Each control 72 is accompanied with a pilot light 74 to indicate current to a given heating rod. In addition, a master pilot light 78 is coupled to a master switch 76 which distributes power to all the potentiometers 72 and their associated pilot lights 74. As shown, a power cord 80 provides a source of current to the apparatus 10.

A fence 90 is provided on the apparatus 10. The purpose of the fence 90 is to serve as an abutment and therefore guide the thermoplastic sheet material with respect to any the of several heating elements 42. As shown in FIG. 1, the fence 90 is disposed at one end of the apparatus 10, but it is contemplated that the fence could be disposed intermediate one or more of the heating rod and support elements 30. The fence 90 includes a slide sleeve 82 (FIG. 1) adapted to be used on slide tube 22 as has been discussed for the heating supports 30. Slide sleeve 82 is fixed on the slide tube 22 by means of an allen screw 86 to hold its position on the tube. The slide sleeve 82 communicates with an upwardly extending gusset 84 which supports the inverted T-shaped fence. The fence has a first horizontal portion 88, a second horizontal portion 89 and a medially disposed upwardly extending barrier 92 which collectively define the inverted T-shaped structure.

In use and operation, the spacing or placement of the heat rod and support 30 can be accurately measured by means of the indicia 18 carried on the side rails 2. In addition, spacing of the heating rod and support 30 with respect to the abutment fence 90 will allow a plurality of heated zones to be made on a thermoplastic sheet 65 in a rapid and facile manner. See FIG. 6. Should more than one bend be required on a piece of thermoplastic material 65, the fence 90 can be interposed between two heating elements. The magnitude of the heat can be controlled through the control box 70 and a bend can be made on successive sides of the fence by merely moving the thermoplastic material 65 from one side of the fence to the other and in close proximity to its respective heating rod.

Moreover, having thus described the invention, it should be apparent that numerous structural modifications and adaptations may be resorted to without departing from the scope and fair meaning of the instant application as set forth here and above and defined here and below by the claims.

I claim:

1. An apparatus for heating thermoplastic sheet material, comprising, in combination:
   a knockdown fram assembly,
   support means coupled to said frame assembly,
   a heating rod housed within said support means said heating rod formed as a straight resistive element positioned within a trough, said trough having a substantially u-shaped cross section along its length and having focusing end barriers directing heat toward a sheet of thermoplastic material
   and coating means on said support means oriented to contact the sheet material while it is being heated, said coating means protecting the sheet material from forming a chalk-like flaw when contacting said support means.

2. The apparatus of claim 1 wherein said support means includes said trough and said end barriers, said end barriers being formed as caps connected to extremities of said trough, said end caps configured as recesses of substantially hemispherical configuration, said heating rod resting in said trough on a plurality of saddles extending up from said trough, whereby said trough and said end caps focus heat from said heating rod upwardly.

3. The apparatus of claim 2 wherein said frame is formed from two spaced parallel side rails interconnected at extremities of said side rails by a pair of spaced parallel end rails, all said rails collectively defining a substantially rectangular frame which is interconnected with fasteners allowing the frame to be knocked down, a pair of slide tubes interconnecting said end rails, oriented parallel to and inboard of said end rails and said support means are slideably disposed on said slide tubes.

4. The apparatus of claim 3 wherein said coating means is formed from Teflon tape adhered to a top surface of said trough, with high temperature paint interposed therebetween to better effect a secure bond between said Teflon tape and said trough.

5. The apparatus of claim 4 including a fence carried on said pair of slide tubes formed from a pair of slide sleeves overlying said slide tube, upwardly extending gussets connecting said slide sleeve with an inverted T-shaped fence, said fence having first and second horizontal portions interrupted with an upwardly extending barrier against which the thermoplastic sheet material abuts, and indicia means on said side rails to assist in orienting said fence and said heating rod along the length of said slide tubes.

6. The apparatus of claim 5 including power control means going to each of plural said heating rods to alter the amount of heat emanating therefrom.

7. An apparatus for heating thermoplastic sheet material, comprising, in combination:
   a knockdown frame assembly,
   support means coupled to said frame assembly,
   a heating rod housed within said support means,
   said support means including a trough having a substantially U-shaped cross section along its length and end caps connected to extremities of said trough, said end caps configured as recesses of substantially hemispherical configuration, said heating rod resting in said trough on a plurality of saddles extending up from said trough, whereby said trough and end caps focus heat from said heating rod upwardly.

8. The apparatus of claim 7 wherein said plural saddles interrupt said trough in such a manner that a plurality of oval recesses are placed along the length of said trough interrupted by said saddles, and said saddles support said heating rod such that an air space is provided under said heating rod within said recesses, providing better heat transfer.

9. The apparatus of claim 8 wherein said trough is supported in a substantially U-shaped channel underlying said trough and having first and second slide sleeves at opposed extremities thereof, said slide sleeves oriented to receive slide tubes therewithin, said slide tubes extending between an interior periphery of said frame, and end covers overlying said trough directly above said slide sleeve, said end covers provided with wingnuts passing therethrough to said slide tube, to fix said heating rod and its associated said support means in fixed position on said slide tube.

10. The apparatus of claim 9 wherein a recess is routed in said trough on a lower outboard edge thereof adjacent said U-shaped channel, and said heating rod includes extremities provided with electrical connection lugs, said lugs contacted with a conductor having female sleeves complementally formed to connect with said lugs extending from said heating rod, said conductor oriented to lie within said recess formed on said trough, and communicate with a control box.

11. The apparatus of claim 10 wherein said control box receives conductors from plural said heating rods and said control box includes a plurality of potentiometers each coupled to a respective one of said conductors thereby controlling the amount of current and therefore heating ability of said heating rod, and pilot light means associated with said control box to indicate the status of said heating rod.

12. The apparatus of claim 11 including coating means on a top surface of said trough bonded thereto by means of high temperature paint interposed between said coating means and said top trough surface, said coating means providing protection for the thermoplastic sheet material from chalking.

13. The apparatus of claim 12 including said frame configured as a pair of two spaced parallel side rails interconnected at extremities thereof by a pair of spaced parallel end rails, said slide tubes extending between said end rails, all said rails collectively defining a substantially rectangular frame which is interconnected with fasteners, allowing the frame to be knocked down and wherein said side rails and end rails are interconnected by means of a flange extending from said end rails and provided with a plurality of holes through which a plurality of fasteners are adapted to pass, said side rails provided with holes oriented to register with the holes on said flange and a plurality of threaded bushings press fit into said holes on said side rails to receive said fasteners.

14. An apparatus for heating thermoplastic sheet material, comprising, in combination:
   a knockdown frame assembly,
   said frame formed from two spaced parallel side rails interconnected at extremities of said side rails by a pair of spaced parallel end rails secured to end surfaces of said side rails all said rails collectively defining a substantially rectangular frame which is interconnected with fasteners allowing the frame to be knocked down,
   a pair of slide tubes interconnecting said end rails, oriented parallel to and inboard of said end rails,
   support means coupled to said frame assembly,
   said support means slideably disposed on said slide tubes, and
   a heating rod housed within said support means, said heating rod formed as an elongate, substantially linear member.

15. The apparatus of claim 14 wherein said side rails and end rails are interconnected by means of a flange fixed to free ends of said end rails, said flange formed with a plurality of holes, holes complementally formed on a wall of said side rails adapted to register with the holes on said flange, a plurality of bushings extending within said holes on said side rails having internal threads, and fasteners passing through said flange and into said bushings, said fasteners provided with a thread pitch complemental to the pitch of said thread within said bushings, thereby providing said knockdown frame.

16. The apparatus of claim 15 including end caps press fit within said end walls of said side rails, said end caps formed with a wall portion and inwardly directed box shaped periphery dimensioned to fit within said side rails.

17. The apparatus of claim 16 wherein said side rails are formed from stock material of substantially square section.

18. The apparatus of claim 17 wherein said slide tubes are fixed to said end rails by means of a screw passing through a top wall of said end rail and oriented to frictionally engage said slide tube.

19. The apparatus of claim 18 including forming said support means as including a trough having a substantially U-shaped cross section along its length and end caps connected to extremities of said trough, said end caps configured as recesses of substantially hemispherical configuration, said heating rod resting in said trough on a plurality of saddles extending up from said trough, whereby said trough and end caps focus heat from said heating rod upwardly.

20. The apparatus of claim 19 including placing coating means on said support means oriented to contact the thermoplastic sheet material while it is being heated, said coating means protecting the sheet material from forming a chalk-like flaw when connecting said support means, said coating means configured as Teflon tape bonded to said trough on a top surface thereof.

21. An apparatus for heating thermoplastic sheet material, comprising, in combination:
   a knockdown frame assembly,
   support means coupled to said frame assembly,
   a heating rod housed within said support means,
   and coating means on said support means oriented to contact the sheet material while it is being heated, said coating means protecting the sheet material from forming a chalk-like flaw when contacting said support means,
   wherein said support means includes a trough having a substantially U-shaped cross section along its length and end caps connected to extremities of said trough, said end caps configured as recesses of substantially hemispherical configuration, said heating rod resting in said trough on a plurality of saddles extending up from said trough, whereby said trough and said end caps focus heat from said heating rod upwardly.

22. An apparatus for heating thermoplastic sheet material, comprising, in combination:
   a knockdown frame assembly,
   said frame formed from two spaced parallel side rails interconnected at extremities of said side rails by a pair of spaced parallel end rails, all said rails collectively defining a substantially rectangular frame which is interconnected with fasteners allowing the frame to be knocked down,
   a pair of slide tubes interconnecting said end rails, oriented parallel to and inboard of said end rails,
   support means coupled to said frame assembly,
   said support means slideably disposed on said slide tubes, and
   a heating rod housed within said support means,
   wherein said side rails and rails are interconnected by means of a flange fixed to free ends of said end rails, said flange formed with a plurality of holes, holes complementally formed on a wall of said side rails adapted to register with the holes on said flange, a plurality of bushings extending within said holes on said side rails having internal threads, and fasteners passing through said flange and into said bushings, said fasteners provided with a thread pitch complemental to the pitch of said thread within said bushings, thereby providing said knockdown frame.

* * * * *